(12) United States Patent
Mitchell et al.

(10) Patent No.: US 12,265,883 B2
(45) Date of Patent: Apr. 1, 2025

(54) OPTOMECHANICAL INTERFACE FOR SPIN QUBITS

(71) Applicant: UTI LIMITED PARTNERSHIP, Calgary (CA)

(72) Inventors: Matthew Mitchell, Calgary (CA); Prasoon Shandilya, Calgary (CA); David Lake, Pasadena, CA (US); Denis Sukachev, Brighton, MA (US); Paul Barclay, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 682 days.

(21) Appl. No.: 17/462,841

(22) Filed: Aug. 31, 2021

(65) Prior Publication Data

US 2023/0066365 A1   Mar. 2, 2023

(51) Int. Cl.
| | | |
|---|---|---|
| G06N 10/00 | (2022.01) | |
| B82Y 10/00 | (2011.01) | |
| G02F 1/00 | (2006.01) | |
| G06F 15/00 | (2006.01) | |

(52) U.S. Cl.
CPC .......... *G06N 10/00* (2019.01); *G02F 1/0072* (2013.01); *G06F 15/00* (2013.01); *B82Y 10/00* (2013.01)

(58) Field of Classification Search
CPC ...... G06N 10/00; G06N 10/40; G02F 1/0072; G06F 15/00; B82Y 10/00; B82Y 20/00
See application file for complete search history.

(56) References Cited

U.S. PATENT DOCUMENTS

| | | | | |
|---|---|---|---|---|
| 2020/0327437 | A1* | 10/2020 | Wang | B81B 3/0029 |
| 2021/0296558 | A1* | 9/2021 | Englund | H10N 39/00 |

OTHER PUBLICATIONS

Young-Ik Sohn et al. Controlling the coherence of a diamond spin qubit through its strain environment. Nature Communications | (2018) 9:2012 | DOI: 10.1038/s41467-018-04340-3 | ww.nature.com/naturecommunications (Year: 2018).*
Awschalom, D.D et al. Quantum technologies with optically interfaced solid-state spins, Nature Photonics 12, 516 (2018).
Hensen, B., et al. Loophole-free Bell inequality violation using electron spins separated by 1.3 kilometres, Nature 526, 682 (2015).
Togan, E., et al. Quantum entanglement between an optical photon and a solid-state spin qubit., Nature 466, 730 (2010).
Humphreys, P.C. et al. Deterministic delivery of remote entanglement on a quantum network, Nature 558, 268 (2018), arXiv:1712.07567.
Wang, H., et al. Deterministic delivery of remote entanglement on a quantum network, Nature 558, 268 (2018), arXiv:1712.07567.
Lee, D., et al. Topical review: spins and mechanics in diamond, Journal of Optics 19, 33001 (2017).
Aspelmeyer, M., et al. Cavity optomechanics, Reviews of Modern Physics 86, 1391 (2014).

(Continued)

*Primary Examiner* — Collin X Beatty
(74) *Attorney, Agent, or Firm* — Brion Raffoul (57) ABSTRACT

Systems and methods for affecting spin qubits. In a resonator, an optical field is generated using photons. The optical field causes a stress field to form in the resonator as portions of the resonator oscillates. These oscillations, tunable using lasers and/or injection locking, drive spin transitions to thereby affect the population of specific NV spin qubits present in the resonator.

22 Claims, 10 Drawing Sheets

(56) References Cited

OTHER PUBLICATIONS

Macquarrie, E.R., et al. Mechanical spin control of nitrogen-vacancy centers in diamond, Physical Review Letters 111, 227602 (2013), arXiv:1306.6356.
Golter, D.A. et al. Coupling a Surface Acoustic Wave to an Electron Spin in Diamond via a Dark State, Physical Review X 6, 41060 (2016).
Whiteley, S.J., et al. Spin-phonon interactions in silicon carbide addressed by Gaussian acoustics, Nature Physics 15, 490 (2019).
Maity, S., et al. Coherent acoustic control of a single silicon vacancy spin in diamond, Nature Communications 11, 193 (2020).
Gruber. A.,et al. Scanning confocal optical microscopy and magnetic resonance on single defect centers, Science 276, 2012 (1997).
Soykal, O.O., et al. Sound-Based Analogue of Cavity Quantum Electrodynamics in Silicon, Phys. Rev. Lett. 107, 235502 (2011).
Khanaliloo, B., et al. High-Q/V Monolithic Diamond Microdisks Fabricated with Quasi-isotropic Etching, Nano Letters 15, 5131 (2015).
Mitchell, M., et al. Realizing Q > 300 000 in diamond microdisks for optomechanics via etch optimization, APL Photonics 4, 16101 (2019).
Rokhsari, H., et al. Radiationpressure-driven micro-mechanical oscillator, Optics Express 13, 5293 (2005).
Poot, M., et al. Backaction limits on self-sustained optomechanical oscillations, Phys. Rev. A 86, 53826 (2012).
Hossein-Zadeh, M., et al. Observation of injection locking in an optomechanical rf oscillator, Applied Physics Letters 93, 191115 (2008).
Hong, B., et al. A General Theory of Injection Locking and Pulling in Electrical Oscillators—Part II: Amplitude Modulation in $LC$ Oscillators, Transient Behavior, and Frequency Division, IEEE Journal of Solid-State Circuits 54, 2122 (2019).
MacQuarrie, E.R., et al. Continuous dynamical decoupling of a single diamond nitrogen-vacancy center spin with a mechanical resonator, Physical Review B 92, 224419 (2015).
Chen, H.Y., et al. Orbital State Manipulation of a Diamond Nitrogen-Vacancy Center Using a Mechanical Resonator, Physical Review Letters 120, 167401 (2018).
MacCabe, G.S. Nanoacoustic resonator with ultralong phonon lifetime, Science 370, 840 (2020).
Chamberland, C., et al.,. Building a fault-tolerant quantum computer using concatenated cat codes, arXiv , 2012.04108 (2020), arXiv:2012.04108.
MacQuarrie, E.R., Cooling a mechanical resonator with nitrogen-vacancy centres using a room temperature excited state spin-strain interaction, Nature Communications 8, 14358 (2017).
Kettler, J., et al. Inducing micromechanical motion by optical excitation of a single quantum dot, Nature Nanotechnology 10.1038/s41565-020-00814-y (2020).
Ghobadi, R., et al.Progress toward cryogen-free spin-photon interfaces based on nitrogen-vacancy centers and optomechanics, Phys. Rev. A 99, 53825 (2019).

* cited by examiner

OPTOMECHANICAL INTERFACE FOR SPIN QUBITS

TECHNICAL FIELD

The present invention relates to quantum computing. More specifically, the present invention relates to systems and methods for controlling quantum computing building blocks (i.e., spin qubits) using light.

BACKGROUND

Quantum technologies are rapidly evolving, driven by applications in quantum sensing, communications, computing, and networking. Optically active defects in solids, colour centres, are one of the most promising platforms for implementing quantum technologies. Their spin degrees of freedom serve as quantum memories that, in some cases, can operate at room temperature. When color centers are entangled with photons, one can form a quantum node, a building block of a quantum network. This can be achieved with microwave spin control and resonant optical excitation, but is hindered by broadening of optical transitions from thermal phonons and spectral diffusion. Furthermore, spin-qubit optical transitions are often outside the telecommunications wavelength band required for long-distance fiber optic transmission. Harnessing the coupling between mechanical degrees of freedom and spins has emerged as an alternative route for controlling spin-qubits. However, connecting spin-mechanical interfaces to optical links to realise a spin-photon interface has remained a challenge.

Acoustic waves in crystals play a key role in practical devices such as modulators, compact electronic filters, and sensors. Mechanical degrees of freedom are also central to many quantum technologies, thanks to their intrinsic ability to couple to a wide range of fields—electrical, magnetic, electromagnetic, and gravitational—through device engineering. For example, phonons mediate quantum gates between trapped ions in quantum computers and can coherently connect superconducting qubits. Experiments with spin-qubits have demonstrated that acoustic waves generated piezoelectrically can control electron spins of diamond and silicon-carbide colour centres in bulk, cantilever, and hybrid resonators, as well as Er ions embedded in cantilevers.

Despite these advances in spin-mechanical devices, combining them with an interface for controlling the mechanical resonator with light has yet to be realized. This capability would enable optomechanical control of spins, but is challenging due to weak interactions between mechanical resonators and photons.

Based on the above, there is therefore a need for systems and methods that provide an interface that allows for control of spin qubits. Preferably, such an interface would allow not just for control of spin qubits but would also allow for the use of readily accessible technologies for such control.

SUMMARY

The present invention provides systems and methods for affecting spin qubits. In a resonator, an optical field is generated using photons. The optical field causes a stress field to form in the resonator as portions of the resonator oscillate. These oscillations, tunable using lasers and/or injection locking, drive spin transitions to thereby affect the population of specific NV spin qubits present in the resonator.

In a first aspect, the present invention provides a method for manipulating spin qubits, the method comprising:
a) generating an optical field at a resonator;
b) generating a stress field at a mechanical resonance frequency, said stress field being generated due to said optical field;
c) affecting states of spin qubits present on said resonator due to said stress field.

In a second aspect, the present invention provides a method for controlling spin qubits, the method comprising:
generating photons to cause an optical field in a resonator;
causing mechanical oscillations in said resonator due to said optical field;
tuning said oscillations; and
affecting populations of spin qubits in said resonator due to said oscillation.

BRIEF DESCRIPTION OF THE DRAWINGS

The embodiments of the present invention will now be described by reference to the following figures, in which identical reference numerals in different figures indicate identical elements and in which.

DETAILED DESCRIPTION

To better understand the present invention, the reader is directed to the listing of citations at the end of this description. The contents of the citations in the list at the end of this description are hereby incorporated by reference herein in their entirety.

As noted above, there is a need for optomechanical control of spins. In one implementation, a cavity-optomechanical device is used to create an interface that does not depend on optical transitions and can be applied to a wide range of spin qubits. Cavity optomechanical devices solve this challenge: by integrating mechanical resonators within an optical cavity, they increase the photon-phonon interaction time and the optomechanical coupling rate (g). Moreover, they offer a parametric enhancement of g by increasing the number of intracavity photons N, helping to build a coherent optomechanical interface characterized by the optomechanical cooperativity $C=4Ng2/\kappa\gamma>1$, where $\kappa$ and $\gamma$ are the optical cavity and mechanical resonator dissipation rates, respectively. This regime has been realized in a variety of cavity optomechanical devices, including those fabricated from diamond. If they are cooled close to their mechanical ground state, devices with C>1 can control single phonons and generate entanglement between photons and phonons. Thanks to the ability of phonons to couple to many quantum systems, these devices are promising for creating universal quantum transducers, for example between optical photons and superconducting microwave resonators that possess no direct optical coupling.

In one aspect, the present invention allows for the coupling of phonons to both light and electron spins, creating a cavity optomechanical interface with spin qubits. Using telecommunication wavelength photons and operating at room temperature, the present invention allows for, in one implementation, the manipulation of an ensemble of spin qubits embedded in a nanophotonic diamond microdisk cavity.

Figure 1:
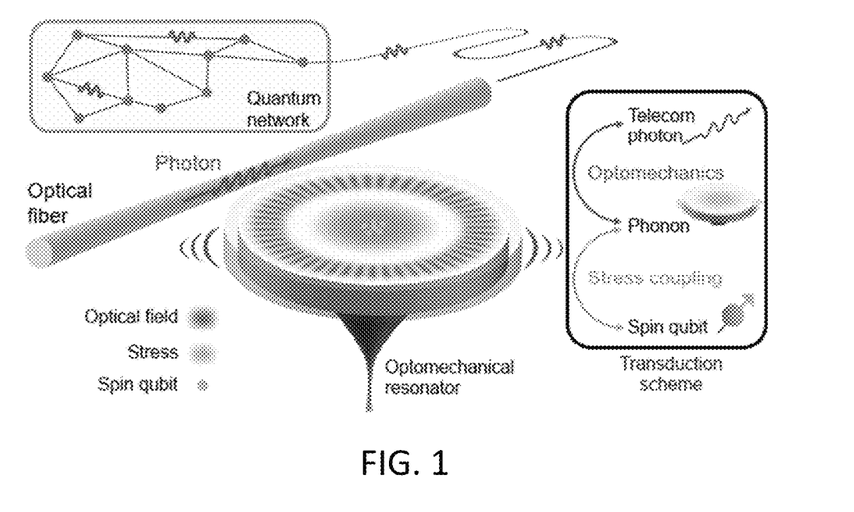
FIG. 1 is a schematic representation of one aspect of the present invention.

Referring to FIG. 1, schematically illustrated is one implementation of the present invention along with the operating principle of the spin-optomechanical interface according to one aspect of the present invention. To explain the operation of the present invention, a microdisk is provided. Radiation pressure from photons in a whispering gallery mode of the microdisk coherently excites vibrations of a mechanical mode of the device. This motion, approximately described by an oscillation of the microdisk diameter, creates a microscopic stress field at the mechanical resonance frequency that interacts with spin qubits in the diamond material. The optomechanical interaction can be tuned for reversible photon-phonon conversion, and can operate in any wavelength range where there is a cavity mode. The photons can be generated using telecommunication frequencies of light and the resulting photon-spin interface does not rely on qubit optical transitions. The interface allows for manipulation of diamond nitrogen-vacancy (NV) spins with telecommunication light at room temperature. Moreover, the system can be adapted to control other color centers, including optically inactive qubits in solids, and can be adapted to manipulate other systems such as quantum-dot single-photon sources. It should also be clear that other types of resonators may also be used (as will be explained below).

As can be seen from the right side of FIG. 1, a photon causes a phonon to form and this phonon, through stress coupling, affects one or more spin qubits.

As is known, nanophotonic devices such as microdisks are particularly suited for creating spin-optomechanical interfaces. Their small size provides access to mechanical modes with frequencies exceeding a GHz that can be tuned to resonance with a variety of qubit systems, and can be cooled cryogenically to low thermal phonon occupation. Small mechanical mode volume increases spin-phonon coupling rates while small optical mode volume enhances photon-phonon coupling, a key ingredient for reaching C>1.

The microdisk used in one implementation was designed to minimize mechanical mode volume while maintaining the optical properties needed for coherent optomechanics. In one implementation, the microdisk (a 5.3 μm diameter device) was patterned from a bulk diamond chip (Element Six, optical grade) using quasi-isotropic plasma etching. An optical mode at wavelength $\lambda o=1564$ nm with intrinsic quality factor Qo=114000 was used to measure and drive the device's mechanical resonances. For this implementation, the microdisk couples most strongly to the radial breathing mode (RBM), whose displacement and stress distribution is shown in FIG. 2A.

From thermomechanical spectroscopy, for this implementation, the measured frequency and quality factor are $\omega m/2\pi=2.09$ GHz and Qm=4300, respectively. Because of the microdisk's small diameter, the interaction between these optical and mechanical modes has a large per-photon coupling rate $g/2\pi\sim25$ kHz, as described previously. The RBM creates mechanical stress predominantly along the microdisk diameter, $\hat{r}$, and tangential, $\hat{\varphi}$, unit vectors, which are shown in FIG. 2A. Other stress tensor components are an order of magnitude smaller. This stress field is concentrated at the centre of the microdisk, where a single phonon is predicted to produce a stress of p0~1 kPa. While this per-phonon stress is close to the state-of-the-art, it is too weak for single-phonon driving of NV ground-state spin qubits used in this implementation. Instead, a large coherent phononic state using phonon lasing [42] is generated and used.

Figure 2A:
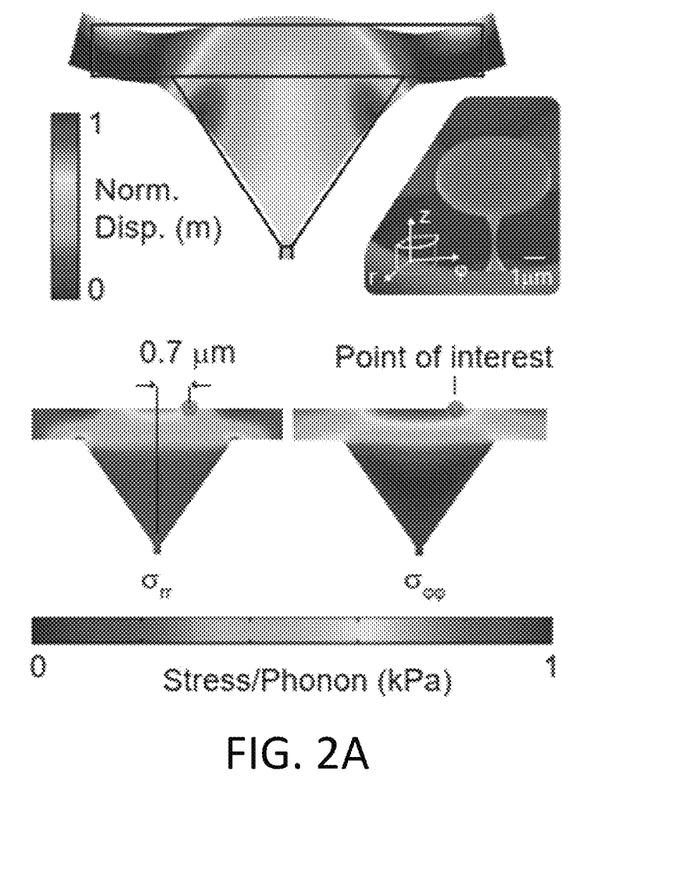
FIG. 2A shows the displacement profile for radial breathing mode (RBM) for one implementation of the present invention.
Figure 2B:
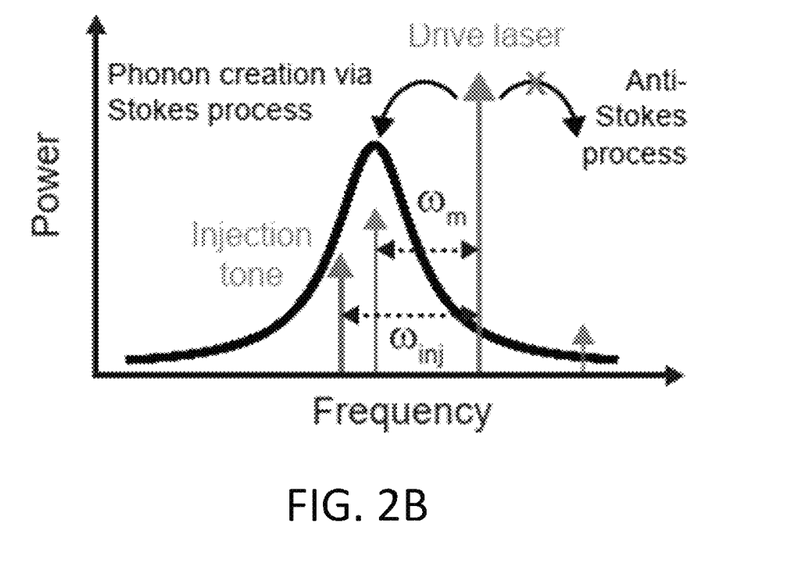
FIG. 2B shows relative frequencies of relevant optical fields during phonon locking for one implementation of the present invention.
Figure 2C:
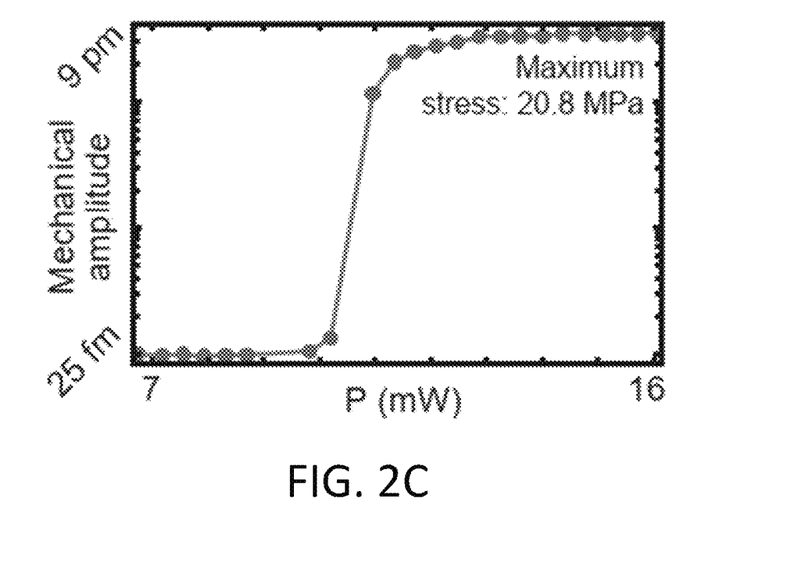
FIG. 2C shows the measured amplitude of the optomechanically amplified RBM for varying optical power input to a fiber taper waveguide in one implementation of the present invention.

Regarding the phonon lasing process, illustrated in FIG. 2B, the process requires optically driving a sideband resolved cavity ($\omega m>\kappa$) (such as the microdisk for this implementation) with a laser blue-detuned by om from resonance. The resulting Stokes process simultaneously scatters a laser photon into resonance with the optical cavity mode and creates a phonon in the mechanical mode. For sideband-resolved systems, the anti-Stokes process is far from resonance with the cavity and is suppressed. When the drive field strength is high enough for $C\geq 1$, the phonon generation rate exceeds its intrinsic dissipation rate $\gamma$, and the mechanical mode self-oscillates. This is characterized by a dramatic narrowing of the RBM's effective linewidth and an increase in mechanical oscillation amplitude. This effect is shown in FIG. 2C, which plots the measured amplitude of the RBM for varying power of the blue-detuned drive laser input to the fiber taper, clearly showing a threshold near 10.2 mW (~0.5 mW dropped into the cavity). Despite a large number of intracavity photons at this power, thermo-optic instability is minimized because of diamond's low nonlinear absorption and high thermal conductivity. Nonlinearity in the cavity's optical response as a function of displacement clamps the maximum oscillation amplitude, which can be increased using a lower-Qo optical mode at the expense of higher drive laser power.

Figure 2D:
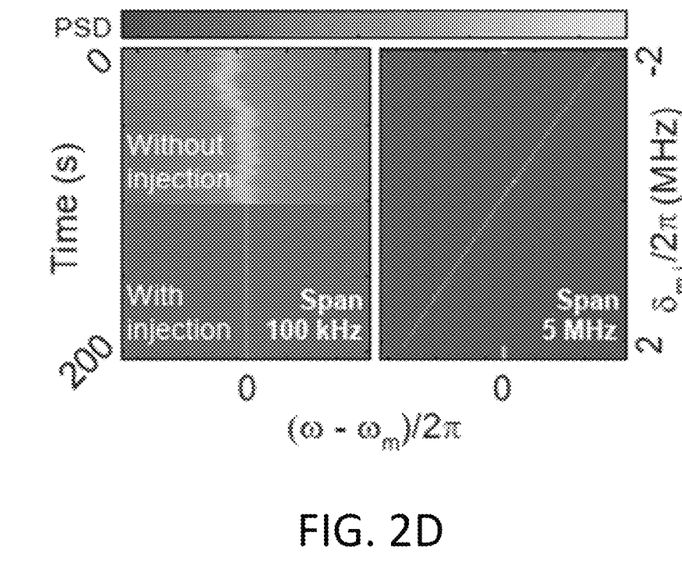
FIG. 2D shows power spectral density (PSD) spectrographs of the RBM displacement for both free-running and injection locked self oscillations.
Figure 2E:
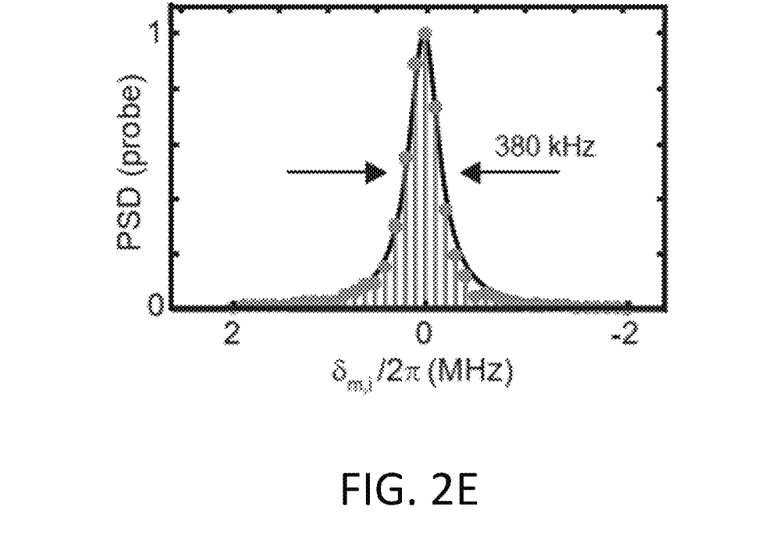
FIG. 2E shows a normalized PSD for one implementation of the present invention.

For clarity, FIG. 2A shows the displacement profile of the RBM and cross-sections for its radial $6\sigma_{rr}$ and azimuthal $\pi_{\varphi\varphi}$, stress tensor components produced by a single phonon. 'Point of interest' is the location of the confocal spot for the collection of NV photoluminescence. The inset in the right side of FIG. 2A shows a scanning electron micrograph image of the microdisk under study. FIG. 2B, on the other hand, shows the relative frequencies of the relevant optical fields and optical cavity mode (black Lorentzian) during phonon lasing with injection locking. FIG. 2C shows the measured amplitude of the optomechanically amplified RBM for varying optical power input to the fiber taper waveguide. FIG. 2D illustrates the power spectral density (PSD) spectrographs of the RBM displacement for free-running (top-left) and injection-locked (bottom-left) self-oscillations. In FIG. 2D, the right panel shows the PSD for varying injection locking frequency. The color bar spans 90 dBm. FIG. 2E shows the normalized PSD as a function of $\delta_{m,i}$. In FIG. 2E, the red lines are the PSD spectra for the injection locked RBM at discretely varying $\delta_{m,I}$ while the grey dots are the peak values of each PSD, which are fit to a Lorentzian.

The maximum displacement of 9 pm (measured in FIG. 2C by calibrating the optomechanically transduced signal during self-oscillations with that of thermomechanical motion at low drive laser power) corresponds to a maximum stress $p_{max}$=20.8 MPa, which is large enough to drive diamond NV spin qubits. However, the spin-optomechanical interface also requires that the self-oscillation frequency is resonant with the desired electron spin transition frequency ($\omega_s$). As discussed below, $\omega_s$ is coarsely tuned with an external magnetic field. The mechanical oscillation frequency is fine-tuned with an easily adjustable injection locking scheme. When the drive laser is phase modulated at frequency $\omega_{inj}$ set by an external radio-frequency source, the resulting modulation of the intracavity radiation pressure entrains the mechanics. Without injection locking, the self-oscillation frequency slowly drifts due to fluctuations in the environment and driving laser parameters (See FIG. 2D top-left). When injection locking is on, the mechanical motion is phase-locked and the self-oscillation frequency is stable (See FIG. 2D bottom-left). More importantly, the self-oscillation frequency can be tuned by more than 5 MHz by adjusting the detuning $\delta_{m,i}=\delta_m-\delta_{inj}$ between the intrinsic mechanical frequency and the injection tone (See FIG. 2D right). However, as shown in FIG. 2E, the optomechanically transduced mechanical power spectral density decreases as $|\delta_{m,i}|$ increases. This dependence has a Lorentzian profile whose FWHM $2\pi\times 380$ kHz is close to the intrinsic bandwidth of the mechanical resonance, $\gamma=\omega_m/Q_m\approx 2\pi\times 490$ kHz. The largest self-oscillation amplitude occurs when the injected tone and the mechanical frequency are resonant ($\delta_{m,i}=0$). As a result, to maximize optomechanical spin-driving the intrinsic spin-mechanics detuning $\delta_{s,m}=\delta_s-\delta_m$ should be set as close to zero as possible by the magnetic field.

This tunable phonon lasing can be used to demonstrate a spin-optomechanical interface between photons and diamond NV center spin qubits. The negatively charged NV center has an electron spin-triplet ground state, $\{|0i, |\pm 1i\}$ (See FIG. 3A), that can be optically initialized and readout at room temperature. Mechanical control of these spins arises from the deformation of their molecular orbitals by strain in the crystal lattice, which displaces the carbon atoms surrounding the vacancy and substitutional nitrogen atom that form the NV point defect (See FIG. 3B). Previous studies of coupling NV centers to mechanical resonators have led to new spin manipulation capabilities, techniques for suppressing NV decoherence, and tuning of NV emission wavelength. However, the lack of optical cavities in these spin-mechanical systems has prevented interfacing them with photons. The diamond microdisks used in one implementation of the present invention provide this needed element, enabling optomechanical manipulation of the strain-coupled $|-1\rangle\rightarrow|+1\rangle$ transition.

Figure 3A:
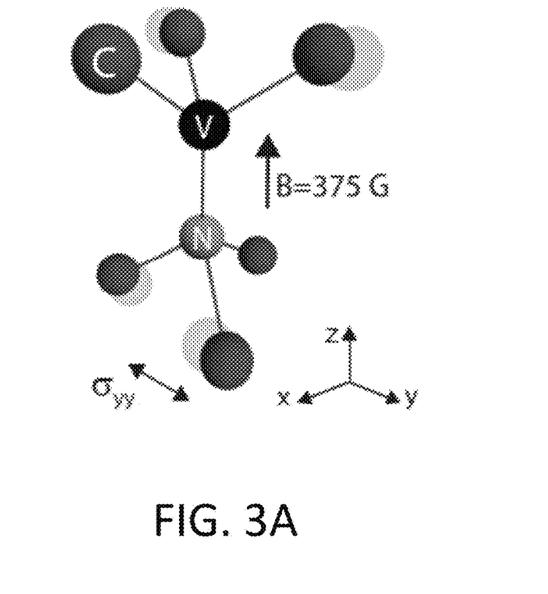
FIG. 3A illustrates the atomic structure of the NV center.
Figure 3B:
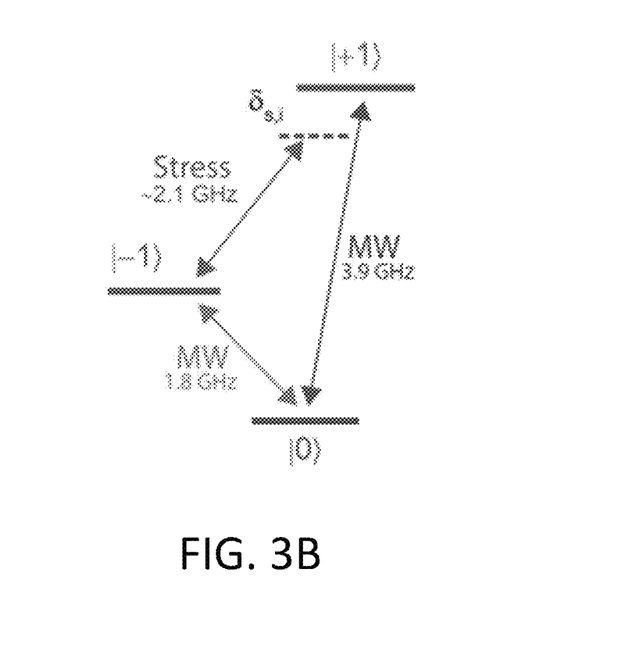
FIG. 3B is an energy level diagram of the NV ground state spin triplet.

It should be clear that, referring to FIG. 3A, illustrated is the atomic structure of the NV center. Grey circles represent the displacement of carbon atoms under a stress along the y-axis ($\sigma_{yy}$). In FIG. 3B, presented is an energy level diagram of the NV ground state spin triplet at a magnetic field B=375 G applied along the NV symmetry axis (z). In this, $\delta_{s,i}$ is the detuning between the injection locked mechanical self-oscillation frequency and the $|+1\rangle\rightarrow|-1\rangle$ spin transition.

Figure 3C:
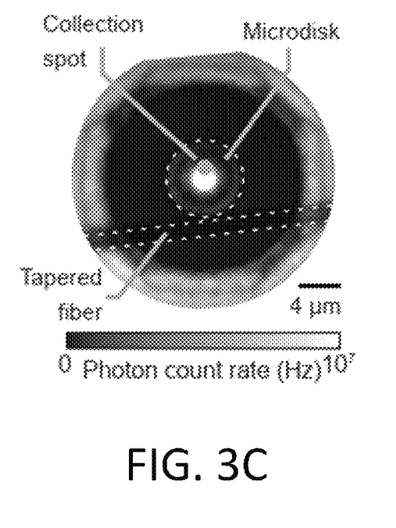
FIG. 3C is a photoluminescence scan over the microdisk of one implementation of the present invention.
Figure 3D:
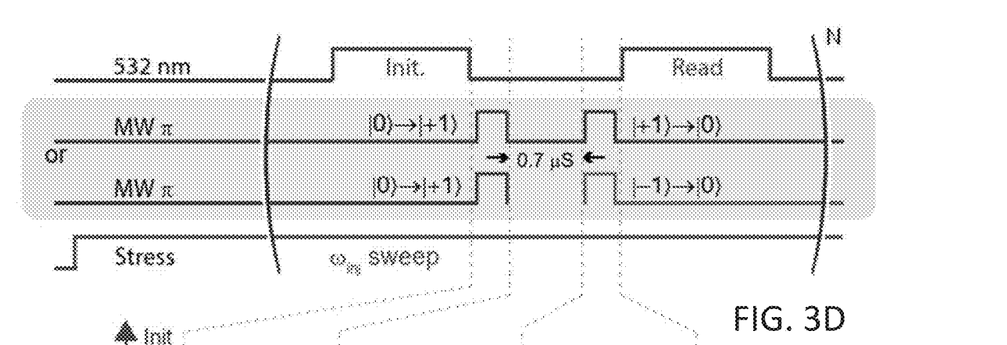
FIG. 3D shows the pulse sequence used during measurements of the optomechanical spins driving.
Figure 3E:
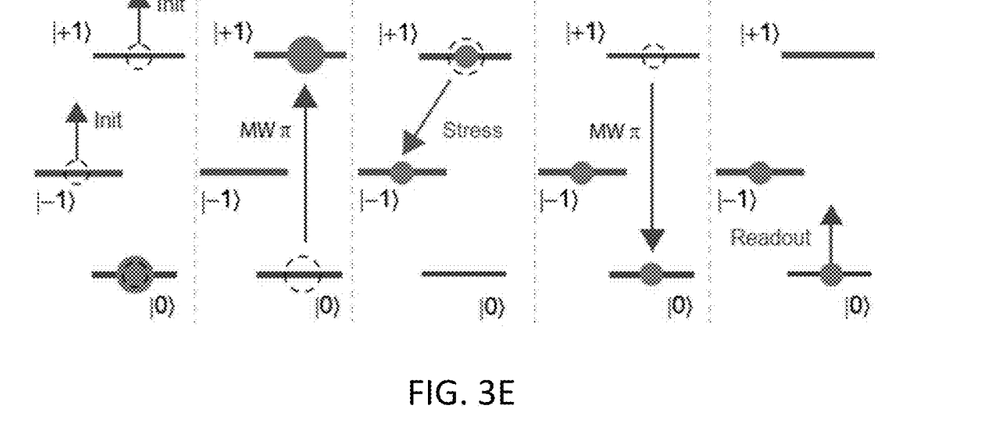
FIG. 3E shows the population of NV levels at each step of the pulse sequence shown in FIG. 3D.

Referring to FIG. 3C, illustrated is a photoluminescence scan over the microdisk of one implementation of the invention, showing the position of the NV measurement spot. FIG. 3D shows the pulse sequence used during measurements of optomechanical NV spin driving. Referring to FIG. 3E, shown is the population of NV levels at each step of the pulse sequence in FIG. 3D. In this diagram, the diameter of each solid red (dashed black) circle represents population after (before) each step.

To study spin-optomechanical coupling, the device used in one implementation was mounted in a confocal microscope operating in ambient conditions. FIG. 3C shows an image of the device obtained by collecting NV fluorescence upon excitation with 532-nm light when the microscope's 0.8 NA objective is rastered over the microdisk. An external magnetic field of 375 G is aligned along one of four possible NV crystallographic orientations and splits the $|\pm 1\rangle$ levels of this subset of NVs close to resonance with the intrinsic mechanical frequency. A thin wire delivers microwave pulses for spin characterization and manipulation during the spin state initialization and readout sequences discussed below.

For the NVs at the point of the maximum stress at the centre of the microdisk (See FIG. 2A), it is predicted that the mechanical self-oscillations will drive the spin transition with a maximum rate $\Omega_{max}\text{m}\approx 2\pi\times p_{max}g_{str}\approx 2\pi\times 395$ kHz, where $g_{str}\approx 19$ Hz/kPa is the NV-stress susceptibility [25]. Unfortunately, the photoluminescence at the center of the device is dominated by NV centers in the pedestal, as shown in FIG. 3C. Pedestal NVs are nominally uncoupled to the RBM, and their emission degrades the spin-readout signal of NVs in the microdisk. As a compromise, NVs offset 0.7 µm from the microdisk center are reviewed, as indicated in FIG. 4C and FIG. 3C. Here stress is reduced by less than 30%, and the luminescence is sufficiently suppressed for a spin-mechanics signal to be observed.

To measure the stress-induced driving of NV spins, the pulse sequence shown in FIG. 3D is applied. First, NVs are prepared in $|0\rangle$ via optical pumping with a 532 nm laser (see FIG. 4E). Then a microwave $\pi$-pulse transfers spins from $|0\rangle$ to $|+1\rangle$. The transition $|+1\rangle\rightarrow|-1\rangle$ is then mechanically driven for 7 µs at a frequency set by the injection locking tone $\omega_{inj}$. Finally, the population p+1 remaining in $|+1\rangle$ is measured by transferring it back to $|0\rangle$ with a second microwave $\pi$-pulse, followed by a readout of the population in $|0\rangle$ using a green laser pulse. During this sequence, the mechanical driving depletes the population in $|+1\rangle$ by promoting it to $|-1\rangle$. Upon readout, this appears as the missing population in $|0\rangle$. The scheme is then repeated with the microwave $\pi$-pulses modified to readout the population p−1 mechanically transferred from spins initialized in $|+1\rangle$ to $|-1\rangle$.

As described above, the mechanical amplitude is maximum when $\delta_{m,i}=0$ (see FIG. 2E). On the other hand, the most efficient spin-stress driving is expected when the spin transition is resonant with the driven injection locked mechanical frequency ($\delta_{s,i}=0$). Both conditions can be met simultaneously if $\delta_{s,m}=0$ through precise magnetic field tuning of the spin transition. However, in one implementation, the closest to this condition that was achieved was $\delta_{s,m}=2\pi\times 182$ kHz. A measurement of p±1 as a function of $\delta_{s,i}$ was taken by varying the injection lock frequency (see FIG. 4A). The coinciding dip in p+1 and peak in p−1, together with their dependence on $\delta_{s,i}$, verifies that spins are being optomechanically driven in the experiment. As a control dataset, the same measurements were repeated with the intrinsic mechanical frequency far from the spin resonance, $\delta_{s,m}/2\pi=-769$ kHz (see FIG. 4B). Setting the injection locking detuning to compensate for the spin-mechanics detuning, $\delta_{m,i}=-\delta_{m,s}$, brings the locked mechanical frequency back to the NV spin resonance, but at a significantly reduced mechanical amplitude, as shown in FIG. 2E. Within the measurement's signal-to-noise ratio, no peaks or dips were reliably identified in this case, which supports the above assertions. Next, these measurements were repeated for varying mechanical amplitude by changing $\delta_{s,m}$ while keeping $\delta_{s,i}$ constant via adjustment of $\omega_{inj}$ (See FIG. 4C). This was possible because of the slow drift in $\delta_{s,m}$ over the course of several measurement runs. As expected, the transferred spin populations monotonically increases with stress amplitude.

Figure 4A:
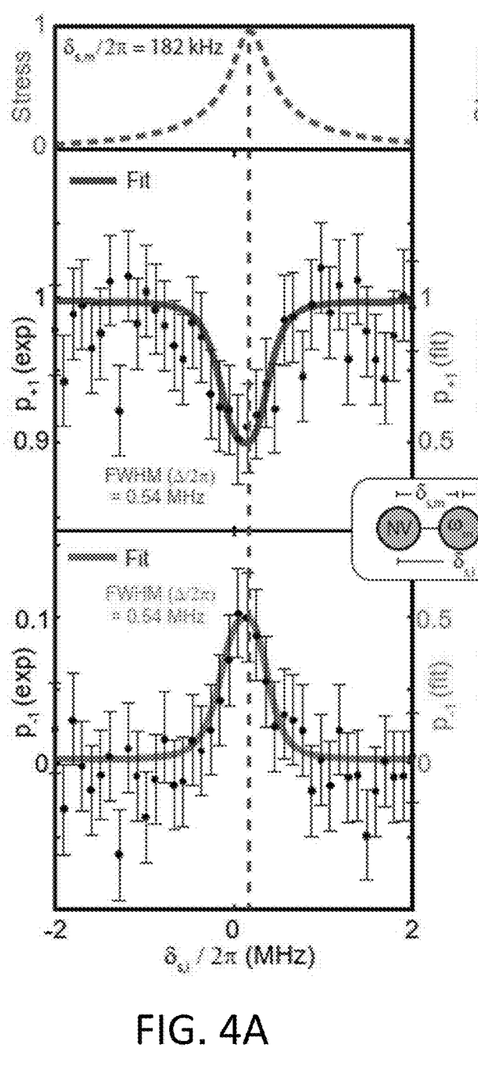
FIG. 4A is a diagram illustrating the measured populations of one type of spin qubit for one implementation of the present invention under specific conditions.
Figure 4B:
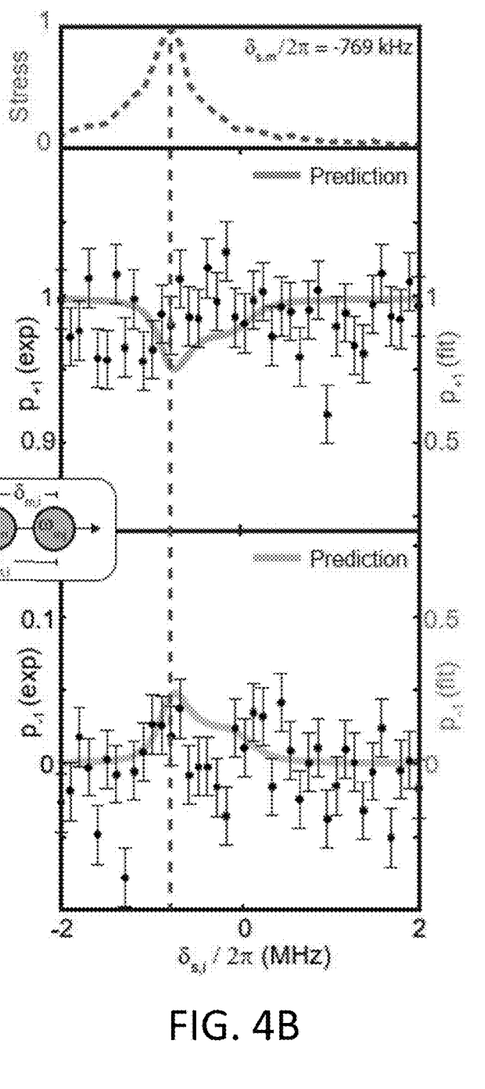
FIG. 4B is a is a diagram illustrating the measured populations of one type of spin qubit for one implementation of the present invention under conditions slightly different from those used in FIG. 4A.
Figure 4C:
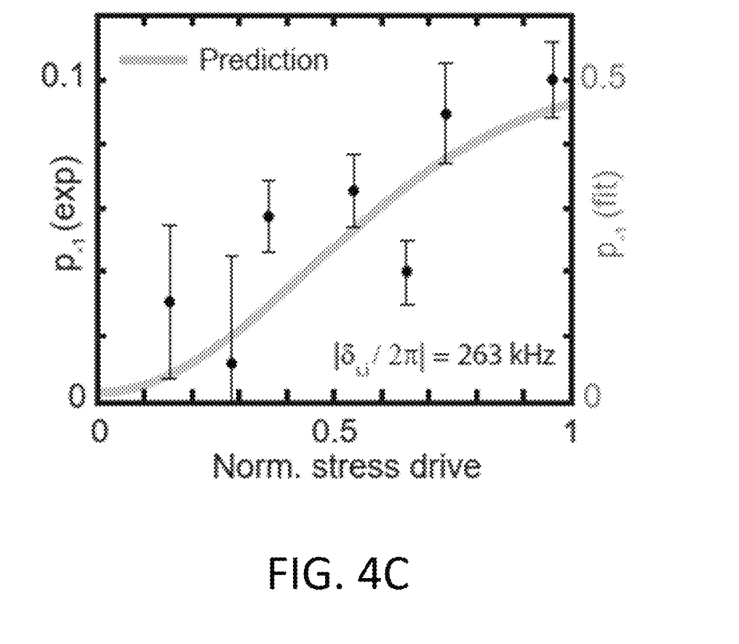
FIG. 4C shows the measured population for another type of spin qubit under different specific conditions.
Figure 4D:
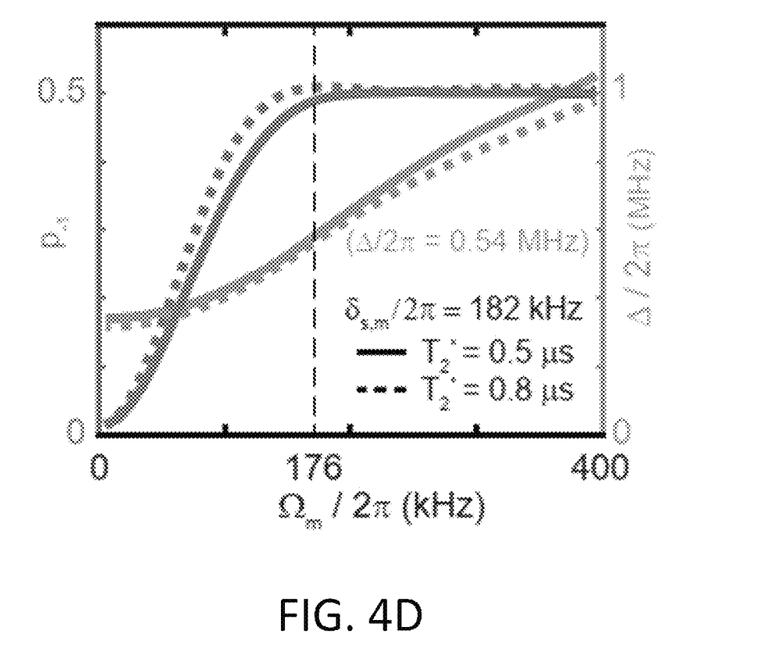
FIG. 4D shows the simulated FWHM and population change for different spin-stress coupling strength.

It should be clear that FIGS. 4A-4E relate to the optomechanical control of NV centers. FIG. 4A shows the measured populations of |±1⟩ when the self-oscillation injection locking frequency (and hence $\delta_{s,i}$) is varied, for 7 μs of mechanical drive and $\delta_{s,m}/2\pi=182$ kHz. The top panel in FIG. 4A shows the corresponding measured variation in optomechanically induced stress. For clarity, in FIG. 4A, solid lines are fitted to the model. It should be clear that the vertical scale for theoretical curves is shown on the right Y-axis of these figures. FIG. 4B shows the measured populations of |±1⟩ when the self-oscillation injection locking frequency (and hence $\delta_{s,i}$) is varied, for 7 μs of mechanical drive and $\delta_{s,m}/2\pi=-769$ kHz. For FIG. 4B, solid lines are theoretical predictions based on parameters used to result in FIG. 4A. The inset between FIG. 4A and FIG. 4B shows the detunings between the NV spin transition, the intrinsic mechanical frequency, and the injection locking tone. FIG. 4C shows the measured population of |−1⟩ for varying optomechanically induced stress after 7 mus of mechanical drive when $|\delta_{s,i}|2\pi=263$ kHz. FIG. 4D illustrates simulated FWHM (Δ) and population change for different spin-stress coupling strength $\Omega_m$, generated using the $\delta_{s,i}$ dependent stress amplitude from FIG. 4A for $T_2^*=0.5$ and 0.8 μs when $\delta_{s,m}/2\pi=182$ kHz.

To extract the spin-stress coupling rate $\Omega_m$ from the measurements, these are fitted with a quantum master equation model. FIG. 4D shows the predicted population change and FWHM of the features in p±1 as a function of $\Omega_m$ for $\delta_{s,m}/2\pi=182$ kHz. A precise determination of $\Omega_m$ is complicated by the above unknown fraction r of fluorescence from NVs in the pedestal that are not affected by mechanical motion and reduce the contrast in FIGS. 4A-4C. Assuming r=0 a lower bound of $\Omega_m/2\pi>50$ kHz is found for the observed 10% change of the signal in FIG. 4A. However, the corresponding predicted FWHM/$2\pi\approx300$ kHz for this coupling rate is significantly smaller than the measured $\Delta/2\pi\approx540$ kHz. This cannot be explained by NV inhomogeneous broadening (~500 kHz) or by other parameters except for non-zero r. Including r as a free parameter in the model produces $\Omega_m/2\pi=176\pm40$ kHz and r ≈0.8. This result is robust against the uncertainty in measured NV T2* time (FIG. 4D), as varying it from 0.5 μs (solid line) to 0.8 μs (dotted line) only changes the predicted om by 10 kHz. Using these parameters, the predicted signal is plotted for the data shown in FIGS. 4B and 4C. Given the signal-to-noise, the experimental results agree with the model. The $\Omega_m$ is estimated using NV stress sensitivity, simulated averaged coupling rate per single phonon ($2\pi\times5$ Hz), and the measured number of phonons in the self-oscillating regime (~4×108). This estimate is given as $Q_m/2\pi\approx100$ kHz and is in good agreement with the above figures. These numbers are smaller than $\Omega_m^{max}$ mostly because of the finite off-set of the measured location from the microdisk center and a non-ideal NV orientation with respect to the stress tensor.

The above description details an optomechanical interface between classical light and solid-state spin qubits that does not require any resonant optical transitions. This allows operation at telecommunication wavelengths regardless of the qubit's resonant wavelength, offers protection from spectral diffusion, and can be used for qubits without optical transitions.

For clarity, the various embodiments of the present invention involve an interface that allows for manipulation and/or control of the spin of spin qubits by way of light. Such light, in wavelengths usually used for telecommunications purposes, is used to generate an optical field at a resonator. In one implementation, the resonator is a microdisk. The optical field, through its radiation, causes a stress field in the resonator such that oscillations of the microdisk are caused. The oscillations are coarsely tuned using a phonon lasing technique that, in one implementation, involves a detuned laser. Using this phonon lasing technique causes the mechanical mode to self-oscillate and the oscillation can be fine tuned using an adjustable injection locking scheme. The self-oscillations (or stress) drive the spins from one state to another. This phenomenon was observed and measured by measuring the population of specific NV spins.

While the above description relates to the use of a microdisk resonator and photons to affect spin qubits in the form of diamond nitrogen-vacancy (NV) spins, other implementations are, of course, possible. One possibility (illustrated schematically in FIG. 5), uses SiV centers (diamond silicon vacancy color centers) instead of NV centers and uses optomechanical crystals (OMC) instead of microdisks.

Figure 5:
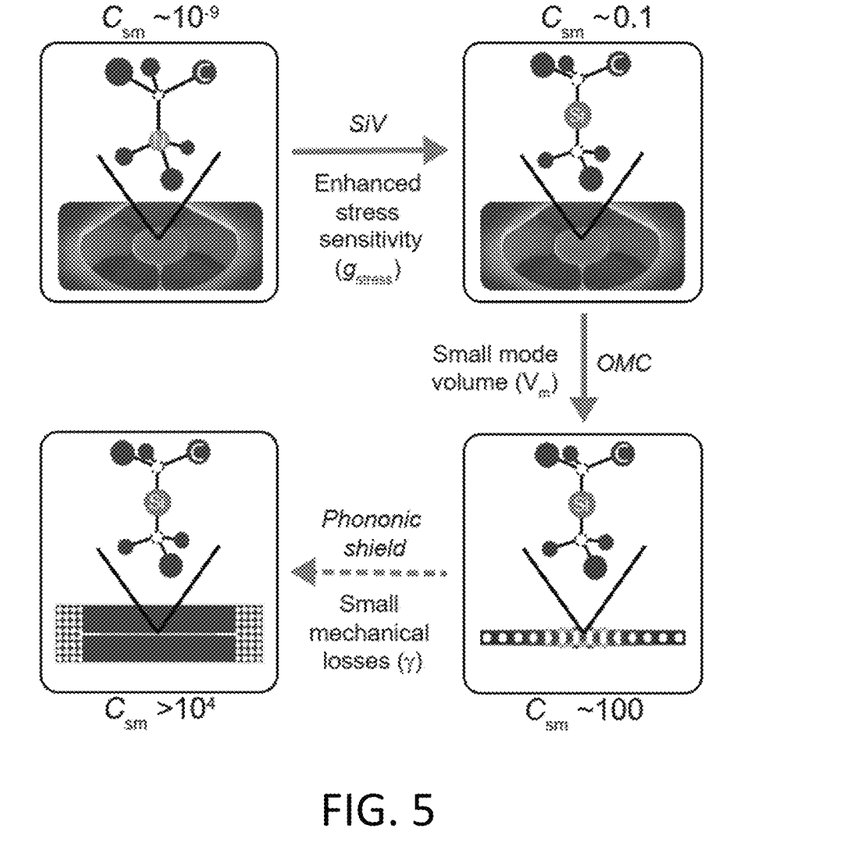
FIG. 5 schematically illustrates another embodiment of one aspect of the present invention.

As can be seen from FIG. 5, the concept is to increase the spin-mechanical cooperativity $C_{sm}$. This can be done by replacing NV centers with SiV centers and this replacement will result in a higher sensitivity to stress, thereby bringing $C_{sm}\approx0.2$. As well, using optomechanical crystals (OMC) rather than microdisks will reduce mechanical mode volume, leading to $C_{sm}\approx100$. These enhancements will make the target of $C_{sm}=100$ feasible. Also, adding phonon shielding to diamond OMC should result in significantly smaller mechanical losses (as has been shown in Si devices) with the projected $C_{sm}>10^4$.

As noted above, spin qubits other than NV centers may be used. Other spin qubits with closely-spaced orbital levels may be used as these couple more strongly to phonons. For example, both the optical excited states of diamond NVs, and the ground states of diamond silicon vacancy (SiV) color centers, have stress sensitivities $g^{NV,es}_{stress}$ and $g^{SiV}_{stress}$, respectively, of $\approx2\pi\times1000$ GHz/GPa, which are 105 times higher than $g^{NV,gs}_{stress}$.

As should be known to those skilled in the art, there are a number of methods by which phonons can be coupled to the spin qubit states. In one method, a magnetic field misaligned from the SiV symmetry axis is used to renormalize state |1⟩ (|2⟩) with an admixture of |↑⟩ (|↓⟩). In this scheme, phonons can directly couple the spin qubit states. This interaction is characterized by an effective stress coupling coefficient $g^{eff}_{stress}$ that, in general, depends on the magnetic field and resulting admixture. Alternatively, one can couple the qubit states using a Raman transition that combines a MW field detuned by δ from the |2⟩→|3⟩ transition with an oscillating stress field coupling |1⟩→|3⟩. This approach has the advantage of allowing dynamical control of the coupling. The spin-phonon coupling strength is characterized by $g^{eff}_{stress} \approx 0.1\ g^{SiV}_{stress} \approx 100$ GHz/GPa, where the pre-factor of 0.1 stems from the requirement that the Raman process is slow compared to δ.

The use of SiV centers in a microdisk resonator can be implemented with a pair of laser fields in place of the MW field to form an optical Raman transition between |2⟩ and |3⟩ via an SiV optical excited state. Raman excitation of SiVs has already been demonstrated at milliKelvin temperatures and can be advantageous since it eliminates the strong MW field that can create excessive heating in a dilution fridge.

Optical Raman excitation can also be used to enhance mechanical coupling to the NV spins via their shared interaction with highly stress sensitive NV optical excited states. This approach would yield similar $C_{sm}$ for an NV in a microdisk as with the SiV-microdisk system noted above.

It should be clear that optomechanical crystals are nanoscale cavity optomechanical devices whose highly confined mechanical resonances have much smaller $V_m^{OMC} \approx 0.1$ μm³.

Regarding phononic shielding, mechanical resonators can be designed to possess ultralow γm through phononic bandgap engineering. Phononic bandgaps restrict the leakage of phonons, which unlike photons, do not scatter out of devices into the surrounding vacuum. Optomechanical crystal cavities can be embedded within phononic crystal shields to reduce $\gamma_m$. This approach has led to the demonstration of $\gamma_m$ below 1 kHz in silicon optomechanical crystal cavities.

The method for affecting spin qubits can thus be summarized in the following general steps:
- generate photons to generate an optical field;
- use the optical field to cause stress in the resonator (i.e., cause the resonator to oscillate); and
- use the stress (i.e., the oscillations) to change/manipulate the NV spins existing in the resonator.

As noted above, the method can be adjusted as desired by tuning the oscillations.

As noted above, for a better understanding of the present invention, the following references may be consulted. Each of these references is hereby incorporated in their entirety by reference.

[1] D. D. Awschalom, R. Hanson, J. Wrachtrup, and B. B. Zhou, Quantum technologies with optically interfaced solid-state spins, Nature Photonics 12, 516 (2018).

[2] B. Hensen, H. Bernien, A. E. Dreau, A. Reiserer, N. Kalb, M. S. Blok, J. Ruitenberg, R. F. Vermeulen, R. N. Schouten, C. Abell´an, W. Amaya, V. Pruneri, M. W. Mitchell, M. Markham, D. J. Twitchen, D. Elkouss, S. Wehner, T. H. Taminiau, and R. Hanson, Loophole-free Bell inequality violation using electron spins separated by 1.3 kilometres, Nature 526, 682 (2015).

[3] E. Togan, Y. Chu, A. S. Trifonov, L. Jiang, J. Maze, L. Childress, M. V. G. Dutt, A. S. Ssrensen, P. R. Hemmer, A. S. Zibrov, and M. D. Lukin, Quantum entanglement between an optical photon and a solid-state spin qubit., Nature 466, 730 (2010).

[4] P. C. Humphreys, N. Kalb, J. P. Morits, R. N. Schouten, R. F. Vermeulen, D. J. Twitchen, M. Markham, and R. Hanson, Deterministic delivery of remote entanglement on a quantum network, Nature 558, 268 (2018), arXiv: 1712.07567. [5] H. Wang and I. Lekavicius, Coupling spins to nanomechanical resonators: Toward quantum spin-mechanics (2020), arXiv:2011.09990 [cond-mat.mes-hall].

[6] D. Lee, K. W. Lee, J. V. Cady, P. Ovartchaiyapong, and A. C. B. Jayich, Topical review: spins and mechanics in diamond, Journal of Optics 19, 33001 (2017).

[7] M. Aspelmeyer, T. J. Kippenberg, and F. Marquardt, Cavity optomechanics, Reviews of Modern Physics 86, 1391 (2014).

[8] E. R. Macquarrie, T. A. Gosavi, N. R. Jungwirth, S. A. Bhave, and G. D. Fuchs, Mechanical spin control of nitrogen-vacancy centers in diamond, Physical Review Letters 111, 227602 (2013), arXiv:1306.6356. [9] D. A. Golter, T. Oo, M. Amezcua, I. Lekavicius, K. A. Stewart, and H. Wang, Coupling a Surface Acoustic Wave to an Electron Spin in Diamond via a Dark State, Physical Review X 6, 41060 (2016).

[10] S. J. Whiteley, G. Wolfowicz, C. P. Anderson, A. Bourassa, H. Ma, M. Ye, G. Koolstra, K. J. Satzinger, M. V. Holt, F. J. Heremans, A. N. Cleland, D. I. Schuster, G. Galli, and D. D. Awschalom, Spin-phonon interactions in silicon carbide addressed by Gaussian acoustics, Nature Physics 15, 490 (2019).

[11] S. Maity, L. Shao, S. Bogdanovi´c, S. Meesala, Y.-I. Sohn, N. Sinclair, B. Pingault, M. Chalupnik, C. Chia, L. Zheng, K. Lai, and M. Lonˇcar, Coherent acoustic control of a single silicon vacancy spin in diamond, Nature Communications 11, 193 (2020).

[12] A. Gruber, A. Drabenstedt, C. Tietz, L. Fleury, J. Wrachtrup, and C. Von Borczyskowski, Scanning confocal optical microscopy and magnetic resonance on single defect centers, Science 276, 2012 (1997).

[13] O. O. Soykal, R. Ruskov, and C. Tahan, Sound-Based Analogue of Cavity Quantum Electrodynamics in Silicon, Phys. Rev. Lett. 107, 235502 (2011).

[14] B. Khanaliloo, M. Mitchell, A. C. Hryciw, and P. E. Barclay, High-Q/V Monolithic Diamond Microdisks Fabricated with Quasi-isotropic Etching, Nano Letters 15, 5131 (2015).

[15] M. Mitchell, D. P. Lake, and P. E. Barclay, Realizing Q>300 000 in diamond microdisks for optomechanics via etch optimization, APL Photonics 4, 16101 (2019).

[16] H. Rokhsari, T. J. Kippenberg, T. Carmon, and K. J. Vahala, Radiation-pressure-driven micro-mechanical oscillator, Optics Express 13, 5293 (2005).

[17] M. Poot, K. Y. Fong, M. Bagheri, W. H. P. Pernice, and H. X. Tang, Backaction limits on self-sustained optomechanical oscillations, Phys. Rev. A 86, 53826 (2012).

[18] M. Hossein-Zadeh and K. J. Vahala, Observation of injection locking in an optomechanical rf oscillator, Applied Physics Letters 93, 191115 (2008).

[19] B. Hong and A. Hajimiri, A General Theory of Injection Locking and Pulling in Electrical Oscillators-Part II: Amplitude Modulation in $LC$ Oscillators, Transient Behavior, and Frequency Division, IEEE Journal of Solid-State Circuits 54, 2122 (2019).

[20] E. R. MacQuarrie, T. A. Gosavi, S. A. Bhave, and G. D. Fuchs, Continuous dynamical decoupling of a single diamond nitrogen-vacancy center spin with a mechanical resonator, Physical Review B 92, 224419 (2015).

[21] H. Y. Chen, E. R. MacQuarrie, and G. D. Fuchs, Orbital State Manipulation of a Diamond Nitrogen-Vacancy Center Using a Mechanical Resonator, Physical Review Letters 120, 167401 (2018).

[22] G. S. MacCabe, H. Ren, J. Luo, J. D. Cohen, H. Zhou, A. Sipahigil, M. Mirhosseini, and O. Painter, Nanoacoustic resonator with ultralong phonon lifetime, Science 370, 840 (2020).

[23] C. Chamberland, K. Noh, P. Arrangoiz-Arriola, E. T. Campbell, C. T. Hann, J. Iverson, H. Putterman, T. C.

Bohdanowicz, S. T. Flammia, A. Keller, G. Refael, J. Preskill, L. Jiang, A. H. Safavi-Naeini, O. Painter, and F. G. S. L. Brandao, Building a fault-tolerant quantum computer using concatenated cat codes, arXiv, 2012.04108 (2020), arXiv:2012.04108. [24] E. R. MacQuarrie, M. Otten, S. K. Gray, and G. D. Fuchs, Cooling a mechanical resonator with nitrogen-vacancy centres using a room temperature excited state spin-strain interaction, Nature Communications 8, 14358 (2017).

[25] J. Kettler, N. Vaish, L. M. de L'epinay, B. Besga, P.-L. de Assis, O. Bourgeois, A. Auff`eves, M. Richard, J. Claudon, J.-M. G´erard, B. Pigeau, O. Arcizet, P. Verlot, and J.-P. Poizat, Inducing micromechanical motion by optical excitation of a single quantum dot, Nature Nanotechnology 10.1038/s41565-020-00814-y (2020).

[26] R. Ghobadi, S. Wein, H. Kaviani, P. Barclay, and C. Simon, Progress toward cryogen-free spin-photon interfaces based on nitrogen-vacancy centers and optomechanics, Phys. Rev. A 99, 53825 (2019).

A person understanding this invention may now conceive of alternative structures and embodiments or variations of the above all of which are intended to fall within the scope of the invention as defined in the claims that follow.

We claim:

1. A method for manipulating spin qubits, the method comprising:
   (a) generating an optical field at a resonator by directing at least one photon along an optical waveguide adjacent said resonator, wherein said optical waveguide is oriented such that said resonator is free from direct irradiation by said at least one photon;
   (b) generating a stress field at a mechanical resonance frequency, said stress field being generated due to said optical field; and
   (c) affecting states of spin qubits present on said resonator by way of said stress field,
   wherein said spin qubits are affected by said stress field regardless of optical transitions of said spin qubits.

2. The method according to claim 1, wherein said resonator is a mechanical resonator.

3. The method according to claim 1, wherein said stress field occurs due to oscillations of components of said resonator.

4. The method according to claim 3, wherein said oscillations are tuned using a laser.

5. The method according to claim 4, wherein said oscillations are further tuned using injection locking.

6. The method according to claim 1, wherein said resonator is a microdisk.

7. The method according to claim 2, wherein said mechanical resonator is an optomechanical resonator.

8. The method according to claim 2, wherein said resonator is an optomechanical crystal.

9. The method according to claim 2, wherein said spin qubits are diamond NV spin qubits.

10. The method according to claim 2, wherein said spin qubits are color centers in solids.

11. The method according to claim 1, further comprising using shielding to prevent phonon leakage.

12. The method according to claim 10, wherein said spin qubits are SiV color centers.

13. The method according to claim 12, wherein phonons are directly coupled to spin qubits by way of a magnetic field misaligned from a symmetry axis of said SiV color centers.

14. The method according to claim 1, wherein phonons are coupled to spin qubits by way of a Raman transition.

15. The method according to claim 1, wherein step (a) is accomplished by photon generation.

16. The method according to claim 15, wherein said photon generation is accomplished using light used for telecommunication purposes.

17. A method for controlling spin qubits, the method comprising:
   generating photons to cause an optical field in a resonator by directing at least one photon along an optical waveguide adjacent said resonator, wherein said optical waveguide is oriented such that said resonator is free from direct irradiation by said at least one photon;
   causing oscillations in said resonator due to said optical field;
   tuning said oscillations; and
   affecting populations of spin qubits in said resonator by way of said oscillation,
   wherein said spin cubits are affected by said stress field regardless of optical transitions of said spin qubits.

18. The method according to claim 17, wherein said resonator is selected from: a microdisk resonator and an optomechanical crystal.

19. The method according to claim 17, wherein said spin qubits are selected from: NV (nitrogen vacancy) center spin qubits and SiV color centers.

20. The method according to claim 17, wherein said tuning is accomplished by way of a phonon lasing process.

21. The method according to claim 17, wherein said tuning is accomplished by way of applying an injection locking process.

22. The method according to claim 17, further comprising using phononic shielding to prevent phonon leakage.

* * * * *